United States Patent
Ayyagari et al.

(10) Patent No.: US 12,047,673 B2
(45) Date of Patent: Jul. 23, 2024

(54) AUTOMATICALLY UPLOAD PHOTOGRAPHS ACCORDING TO REQUIREMENTS

(71) Applicant: International Business Machines Corporation, Armonk, NY (US)

(72) Inventors: Phani Kumar V. U. Ayyagari, Hyderabad (IN); Harikrishna Manchineni, Hyderabad (IN); Sai Prasanth Vuppala, Visakhapatnam (IN); Manish Anand Bhide, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 74 days.

(21) Appl. No.: 17/648,726

(22) Filed: Jan. 24, 2022

(65) Prior Publication Data

US 2023/0239565 A1 Jul. 27, 2023

(51) Int. Cl.
*H04N 23/60* (2023.01)
*G06K 7/14* (2006.01)
*G06V 30/10* (2022.01)

(52) U.S. Cl.
CPC ........... *H04N 23/64* (2023.01); *G06K 7/1417* (2013.01); *G06K 7/1443* (2013.01); *G06V 30/10* (2022.01)

(58) Field of Classification Search
CPC .... H04N 23/64; G06K 7/1417; G06K 7/1443; G06V 30/10
See application file for complete search history.

(56) References Cited

U.S. PATENT DOCUMENTS

| | | | |
|---|---|---|---|
| 8,873,885 B2 | 10/2014 | Klassen | |
| 9,547,426 B2 | 1/2017 | Seely | |
| 2006/0197963 A1 | 9/2006 | Royal | |
| 2013/0050507 A1* | 2/2013 | Syed | H04N 1/00244 348/207.1 |
| 2015/0036003 A1* | 2/2015 | Sakurai | H04N 9/8205 348/207.11 |
| 2015/0281507 A1* | 10/2015 | Konen | G06T 11/00 348/231.6 |
| 2016/0037016 A1 | 2/2016 | Klassen | |
| 2016/0112630 A1* | 4/2016 | Kanumuri | H04N 23/743 348/222.1 |
| 2016/0191775 A1* | 6/2016 | Naguib | G01S 5/02522 348/207.11 |

FOREIGN PATENT DOCUMENTS

JP 2009055088 A * 3/2009

OTHER PUBLICATIONS

"Photo Resizer: Crop, Resize and Share Images In Batch", Microsoft Store, Printed Sep. 1, 2021, 5 pages, <https://www.microsoft.com/en-us/p/photo-resizer-crop-resize-and-share-images-in-batch/9np46zhk6wbl?activetab=pivot:overviewtab>.
Montoya, Santiago Uribe, "Capturing Images", App Sheet Help Center, Printed Sep. 1, 2021, 3 pages, <https://help.appsheet.com/en/articles/961589-capturing-images>.

* cited by examiner

*Primary Examiner* — Ahmed A Berhan
(74) *Attorney, Agent, or Firm* — Edward J. Wixted, III (57) ABSTRACT

In an approach, a processor receives a photograph requirement from an image of an application, the photograph requirement associated with a photograph to be uploaded to the application. A processor adjusts a camera setting based on the photograph requirement. A processor captures the photograph in accordance with the adjusted camera setting.

20 Claims, 4 Drawing Sheets

AUTOMATICALLY UPLOAD PHOTOGRAPHS ACCORDING TO REQUIREMENTS

BACKGROUND

The present invention relates to photographing and uploading an image to an application or website, and more specifically, to automatically uploading a document/image to an application or website according to specified requirements that are obtained and automatically applied when capturing and/or processing the image.

Know your customer or know your client (KYC) guidelines require that an effort is made to verify the identity, suitability, and risks involved with maintaining a relationship (e.g., business relationship). KYC processes may be employed to ensure that proposed customers, agents, etc., are actually who they claim to be. Some companies, such as banks and insurers, may demand that customers provide detailed due diligence information. In general, KYC processes are used to ensure that clients are who they claim to be. KYC processes may require, for example, that a user uploads photographs or documents to a website or application according to a set of image requirements.

SUMMARY

According to an embodiment of the present invention, a computer-implemented method, computer program product, and computer system are provided. A processor receives a photograph requirement from an image of an application, the photograph requirement associated with a photograph to be uploaded to the application. A processor adjusts a camera setting based on the photograph requirement. A processor captures the photograph in accordance with the adjusted camera setting.

DETAILED DESCRIPTION

Embodiments of the present invention recognize that as we transition to a more paperless society, more and more physical documents are digitally uploaded, stored, and made accessible to interested or necessary parties. For example, applications or websites may allow a user to photograph physical documents and upload the photograph for view or reference by concerned parties. Embodiments of the present invention recognize that such a photographed physical document may need to meet one or more specified requirements in order to be successfully uploaded. For example, requirements may specify a particular file format, shape, dimensions, file size, or other requirement. Embodiments of the present invention recognize that it may be difficult or inconvenient for users to adjust camera settings in order to successfully capture and upload a photograph that meets specified requirements. Embodiments of the present invention describe an approach to receive requirements for digitally uploading a photograph and automatically applying camera and photograph processing settings such that when the user captures the image, the resulting photograph automatically conforms to any necessary requirements.

The present invention will now be described in detail with reference to the Figures.

Figure 1:
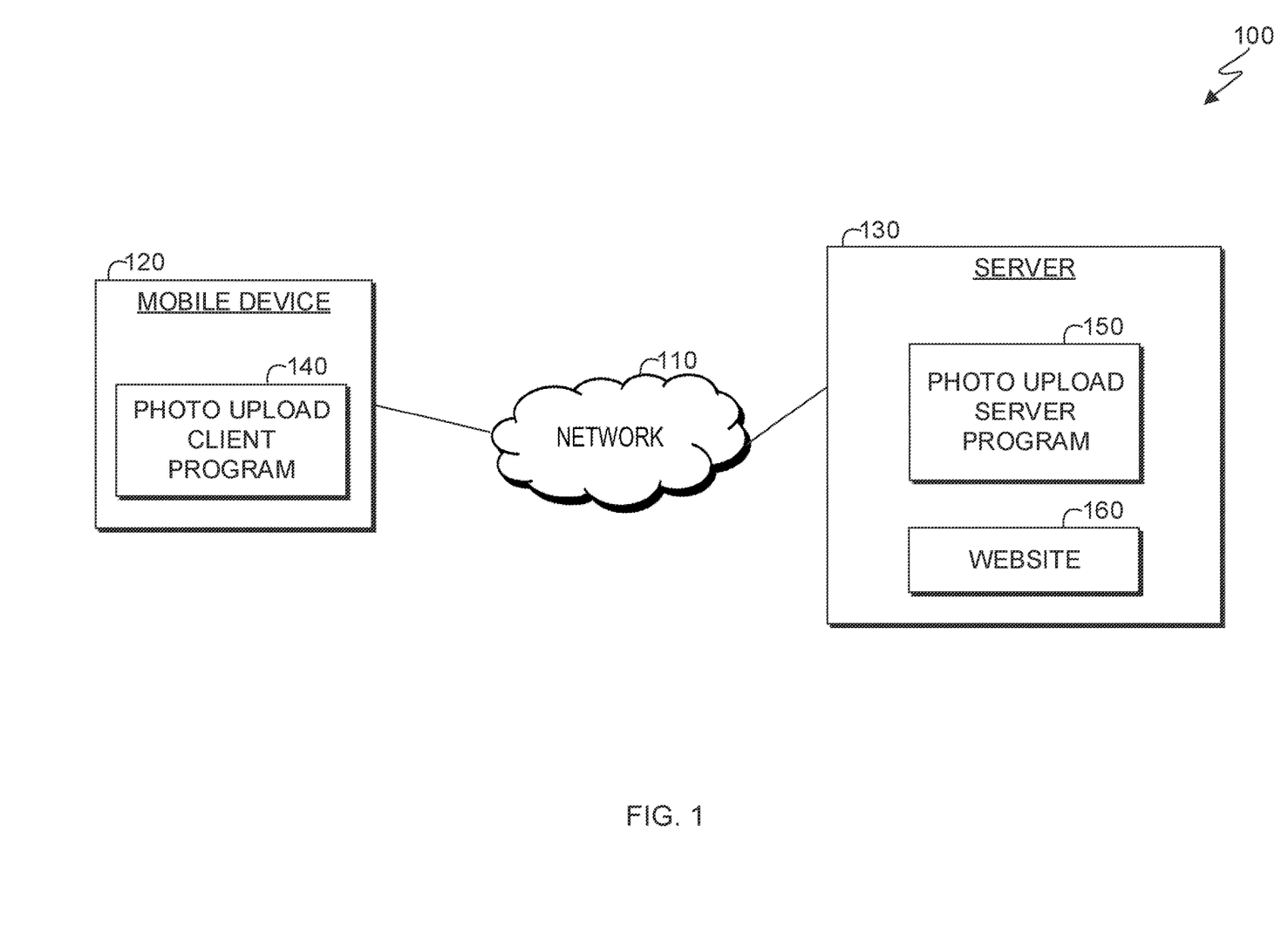
FIG. 1 is a functional block diagram illustrating a computer environment, in accordance with an embodiment of the present invention.

FIG. 1 is a functional block diagram illustrating a computing environment, generally designated 100, in accordance with one embodiment of the present invention. FIG. 1 provides only an illustration of one embodiment and does not imply any limitations with regards to the environments in which different embodiments may be implemented.

In the depicted embodiment, computing environment 100 includes server 130 and mobile device 120 interconnected over network 110. Network 110 may be a local area network (LAN), a wire area network (WAN), such as the Internet, the public switched telephone network (PSTN), any combination thereof, or any combination of connections and protocols that will support communications between server 130 and client device 120, in accordance with embodiments of the present invention. Network 110 may include wired, wireless, or fiber optic connections. Computing environment 100 may include additional servers, computing devices, or other devices not shown.

Server 130 may be a management server, a web server, or any other electronic device or computing system capable of sending and receiving data and communicating with mobile device 120 via, for example, network 110. In some embodiments, server 130 may represent a server computing system utilizing multiple computers as a server system, such as in a cloud computing environment. Server 130 may be an enterprise server capable of hosting or otherwise managing access to a website or application (e.g., mobile application), such as website 160. Server 130 contains website 160 and photo upload server program 150. Server 130 may include components, as depicted and described in further detail with respect to FIG. 4.

Website 160 is a website or application that is accessible by mobile device 120. Website 160 may correspond to, for example, a banking service, insurance service, loan servicing provider, or other type of service. In general, website 160 is a website or application that may specify requirements for the upload of a photograph (e.g., to digitally upload a physical document) and the ability of a user to upload a photograph to the website or application. A user may access website 160 via an application or browser on mobile device 120.

It should be noted that embodiments of the present invention contemplate embodiments where website 160 may be an application. The term website 160 is used herein only for sake of simplicity in discussing embodiments of the present invention. In general, it is contemplated that website 160 is any electronic service or resource that may allow or require a user to upload a photograph meeting one or more requirements specified by the electronic service or resource.

Photo upload server program 150 operates to present photograph requirements (e.g., Quick Response (QR) code, text requirements) and, in some embodiments, receive and/or display a photograph that was captured by a camera of mobile device 120 in accordance with the presented photograph requirements. In one embodiment, photo upload server program 150 resides on a server containing website 160, such as server 130. In other embodiments, photo upload server program 150 may reside on another server, or another computing device, provided that upload server program 150 can communicate with website 160 and photo upload client program 140. In some embodiments, photo upload server program 150 is integrated with a particular website, such as website 160. In other embodiments, photo upload server program 150 may be an external application implemented as a microservice or module that operates to provide photograph formatting and uploading services for website 160.

Mobile device 120 may be a desktop computer, laptop computer, netbook computer, tablet computer, personal digital assistant (PDA), or smartphone. In general, mobile device 120 may be any electronic device or computing system capable of capturing an image utilizing a camera, sending and receiving data, and communicating with server 130, website 160, and/or photo upload server program 150 via, for example, network 110. Mobile device 120 contains photo upload client program 140. Mobile device 120 may include an operating system (OS) that includes one or more application programming interfaces (APIs) that can be exposed by photo upload client program 140 to tune camera attributes and adjust the formatting of captured images. Mobile device 120 may include components, as depicted and described in further detail with respect to FIG. 4.

Photo upload client program 140 operates to obtain requirements for a photograph that a user intends to upload to website 160, obtain confirmation from the user of the requirements, and apply necessary camera settings, as well as pre- and post-processing techniques to the image capture so as to automatically format an obtained image to comply with the obtained requirements. Photo upload client program 140 may also automatically upload the captured image to website 160. In some embodiments, photo upload client program 140 utilizes an API of the OS of mobile device 120 to access and modify camera settings and make any necessary adjustments to a captured image, in accordance with the obtained requirements. In some embodiments, a photo upload client program 140 only captures an image according to such requirements when the user selects a, for example, "custom" mode within the camera application of mobile device 120. For example, the "custom" mode may be a new option/selection similar to existing camera modes that include, for example, slow motion and panoramic modes. In one embodiment, photo upload client program 140 resides on mobile device 120. In other embodiments, photo upload client program 140 may reside on another computing device, provided that photo upload client program 140 can communicate with mobile device 120 and has access to OS APIs that enable the adjustment of camera settings and photograph formatting of images captured by mobile device 120.

Figure 2:
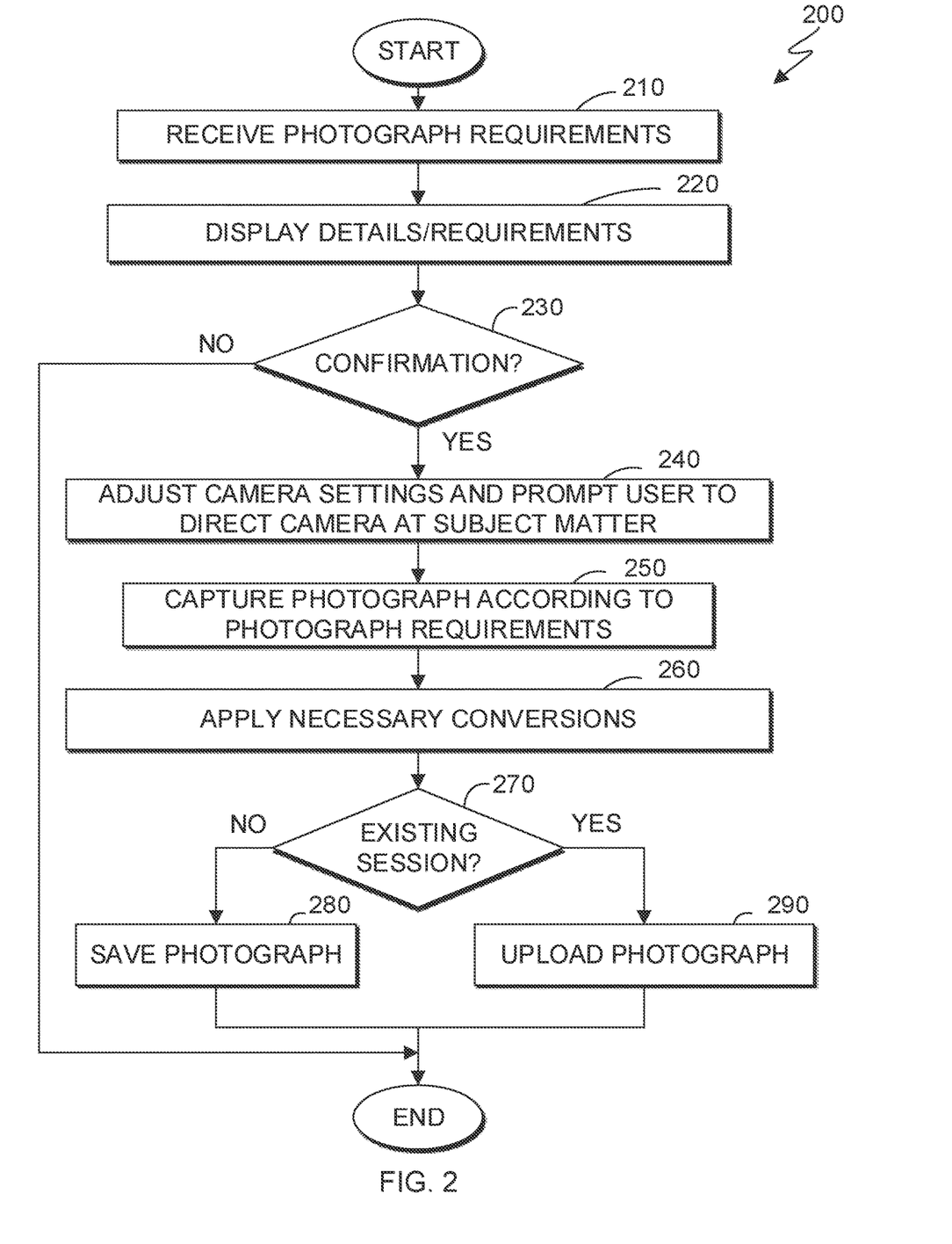
FIG. 2 is a flowchart depicting operational steps of a photo upload client program executing within the computer environment of FIG. 1, for obtaining photograph requirements for a photograph that is intended to be uploaded to an application, applying necessary camera settings and photograph formatting processes, and uploading the obtained image to the application, in accordance with an embodiment of the present invention.

FIG. 2 depicts a flowchart 200 for the steps of photo upload client program 140, executing within computing environment 100 of FIG. 1, for capturing images according to requirements obtained from and specified by website 160 and, in some embodiments, uploading the captured images to website 160.

In one embodiment, initially, a user may access an application, such as website 160, via a web browser or application of mobile device 120 or another computing device. As described above, website 160 may be any website or application that provides a service or otherwise may request or require that a user upload a document or photograph using a camera of mobile device 120. For example, website 160 may be associated with a loan provider requesting that the user uploads a photograph of a pay stub as a prerequisite for approving a loan. Upon accessing website 160, the user may navigate to a webpage or area of the application that prompts or otherwise allows for the user to upload a photograph containing, for example an image of a physical document or other item or person of interest (e.g., an image of the user might be the subject of the image to be uploaded if, for example, the upload is to place an image of the user on a license, passport, or other type of identification card).

In step 210, photo upload client program 140 receives photograph requirements from website 160. In general, if the website is being accessed by a device other than mobile device 120, photo upload client program 140 may receive photograph requirements from website 160 by utilizing network 110 and the camera to take a picture of information that is displayed by website 160. If the user is accessing website 160 via mobile device 120, the photograph requirements displayed by website 160 may be captured via a screen capture or other means. In some embodiments, such as embodiments that utilize a camera to take a picture of information that is displayed by website 160, the user may initially select a custom mode from within the camera application. The custom mode may be a new mode within the camera application similar to that of the slow motion and panoramic modes that presently exist. The custom mode may cause photo upload client program 140 to be initiated.

The photograph requirements may include a variety of formatting requirements and specific requirements may vary based on the requirements specified by the application or website 160. For example, requirements may include photograph subject matter (e.g., particular document, person), shape, size, resolution, file format, time stamp inclusion, digital signature requirements, session details (e.g., details of the login session, transaction, or other information that can be used by photo upload client program 140 to upload the image to website 160 in accordance with the particular session in progress), encryption requirements, watermark requirements, or any other formatting or uploading requirements that may be required by website 160 to successfully process the image upload.

In some embodiments, the photograph requirements of website 160 are specified via a QR code that is displayed on website 160. The QR code can include the photograph requirement information embedded in the QR code itself or, instead, may provide a link that photo upload client program 140 can access to obtain the photograph requirement information for the corresponding session. In such embodiments, a user may initiate photo upload client program 140 by taking a picture of the QR code via screenshotting website 160 or photographing the QR code using a camera of mobile device 120.

In other embodiments, photograph requirements for website 160 are instead presented as text on website 160. For example, text of website 160 detailing photograph requirements may specify that the photograph is to be restricted to a size of 3.5 centimeters (cm) by 4.5 cm before uploading, the image should have a face prominently visible (at least 80% of the image) with both ears visible, and the image should be in either JPEG or Portable Network Graphics (PNG) file formats. In such embodiments, a user may have to manually initiate photo upload client program 140 and, upon being prompted for photograph requirements, take a screenshot of the text detailing the photograph requirements or photograph the text detailing the photograph requirements using a camera of mobile device 120. The manual initiation of photo upload client program 140 may be, in some embodiments, the selection of the custom mode within the camera application of mobile device 120. In such an embodiment, photo upload client program 140 utilizes optical character recognition (OCR) techniques to extract and convert the text of the captured image or screenshot to machine-encoded text. Machine learning and natural language processing (NLP) techniques may be utilized to convert the plain text specified in the photograph requirements of website 160 to attributes that can be used to modify camera settings and/or the resulting photograph. In such an embodiment, a machine learning model may be trained to convert plain text to camera attributes such that the text can be parsed and translated into parameters that photo upload client program 140 can use to modify camera and resulting photograph settings.

In step 220, photo upload client program 140 displays photograph requirements and/or details associated with the desired photograph upload. The requirements may include the photograph requirements specified by website 160, and especially may include requirements that are unable to be automatically satisfied by adjusting camera settings or modifying the image. For example, if it is a requirement that captured image include a particular document, or the user's face, the user will be the party pointing and aiming the camera of mobile device 120 in order to ensure that the correct image is captured. In some embodiments, the details may include permissions that will be provided to the device such as camera setting control, access to photo library for storing and/or modifying captured images, permissions to upload the captured image to website 160, etc. In general, details may be presented to a user to ensure that the user is informed and able to provide confirmation regarding how mobile device 120 will be used, what modifications may be made, what data may be accessed, and how/where the captured photograph will be stored and/or uploaded. Photo upload client program 140 may prompt the user with a confirmation request before granting access or permitting additional action.

In decision 230, photo upload client program 140 determines whether the user has provided confirmation to proceed with the image capture and, in some embodiments, subsequent upload to website 160. As previously described, photo upload client program 140 may generate a prompt asking for the user of mobile device 120 for confirmation to proceed with capturing the desired image. If photo upload client program 140 does not receive confirmation (e.g., the user selects a "no" option when presented with a confirmation prompt) (decision 230, no branch), the program is complete. If photo upload client program 140 receives confirmation from the user (decision 230, yes branch), photo upload client program 140 adjusts camera settings as per the received photograph requirements (see step 210) and generates a prompt at mobile device 120 directing the user to direct the camera of mobile device 120 at the required subject matter (see step 240).

In step 240, photo upload client program 140 adjusts camera settings as per the received photograph requirements (see step 210) and generates a prompt at mobile device 120 directing the user to direct the camera of mobile device 120 at the required subject matter (see step 240).

As described with respect to the photograph requirements, the required subject matter may include, for example, a particular document or document type that is to be uploaded, a photograph of the user's face or head to be used in, for example, a license or other identification card, or any other subject matter. Photo upload client program 140 may activate the camera of mobile device 120 and generate a prompt directing the user to direct the camera at the subject matter specified by the received photograph requirements.

Upon activating the camera, photo upload client program 140 may automatically adjust camera settings to correspond to the received photograph requirements. In some embodiments, the OS of mobile device 120 exposes an integrated API that can be used by photo upload client program 140 to exchange the parameters specified by the photograph requirements to the camera and cause various applicable camera settings to be applied, as opposed to relying on the default attributes of the camera and associated camera application. For example, if the photograph requirements specify that the captured image not exceed one hundred kilobytes (KB), photo upload client program 140 may automatically reduce the pixels and resolution of the image to be captured in order to meet the image file size requirement. In some embodiments, a custom mode must be selected by the user within a camera application. The custom mode may be a camera mode selection similar to slow motion or panoramic modes. In such an embodiment, selection of such a custom mode may allow photo upload client program 140 to access the API and make camera adjustments and post-processing adjustments to the captured image as per the received photograph requirements.

In step 250, photo upload client program 140 uses a camera of mobile device 120 to capture a photograph of the required subject matter in accordance with the received photograph requirements. In some embodiments, photo upload client program 140 captures the photograph in response to a user selecting a capture button on mobile device 120. In other embodiments, photo upload client program 140 may automatically capture the image upon recognizing that the subject matter is in the field of view of the camera. For example, photo upload client program 140 may utilize OCR, machine learning, and/or natural language processing techniques to recognize that, for example, text of a document in the field of view of the camera corresponds to a required document, or recognize that a user face is in the field of view of the camera.

In step 260, photo upload client program 140 applies any necessary conversions to the captured image based on the received photograph requirements. While some of the photograph requirements may correspond to camera settings, others may correspond to post-processing techniques and/or modifications to the image. For example, photo upload client program 140 may convert an image to a required format, adjust the resolution of the image to a required resolution (e.g., by reducing the number of pixels in the image), add a watermark to the image, encrypt the image, apply a digital signature to the image, append metadata to the image, crop the image (e.g., such that the image only includes a required document and not background or other subject matter that may be present in the captured image), apply a filter to the image (e.g., cause the image to be presented in black and white). In general, photo upload client program 140 may make any necessary changes to the format, metadata, or appearance of the captured image in order to comply with the received photograph requirements.

In decision 270, photo upload client program 140 determines whether there is an existing session corresponding to website 160 to allow photo upload client program 140 to automatically upload the captured image. As previously described, in some embodiments, the received photograph requirements may include session details that can provide photo upload client program 140 with destination and identification information necessary to properly upload the captured image to website 160. If photo upload client program 140 determines that there is an existing session (decision 270, yes branch), photo upload client program 140 uploads the photograph to website 160 (see step 290). If photo upload client program 140 determines that there is not an existing session (e.g., photo upload client program 140 determines that there is not information to allow for the upload of the image) (decision 270, no branch), photo upload client program 140 saves the photograph to a photograph library of mobile device 120 (see step 280).

In step 280, photo upload client program 140 saves the photograph to a photograph library of mobile device 120. Photo upload client program 140 saves the captured image that corresponds to the received photograph requirements to a photograph library of mobile device 120. Subsequently, a user may manually upload the captured image to website 160 and, based on the already applied camera settings and/or applied image conversions, ensure that the uploaded image corresponds to the received photograph requirements.

In step 290, photo upload client program 140 uploads the photograph to website 160 based on the received photograph requirements. As previously described, the received photograph requirements may include session information that provides photo upload client program 140 with destination information and/or instructions that enable photo upload client program 140 to upload the captured image to the correct location and with the correct identification information to ensure that the uploaded image is successfully processed by website 160. In such embodiments, a user may not be required to manually upload the captured image to website 160 and photo upload client program 140, instead, automatically uploads the image to website 160.

Figure 3:
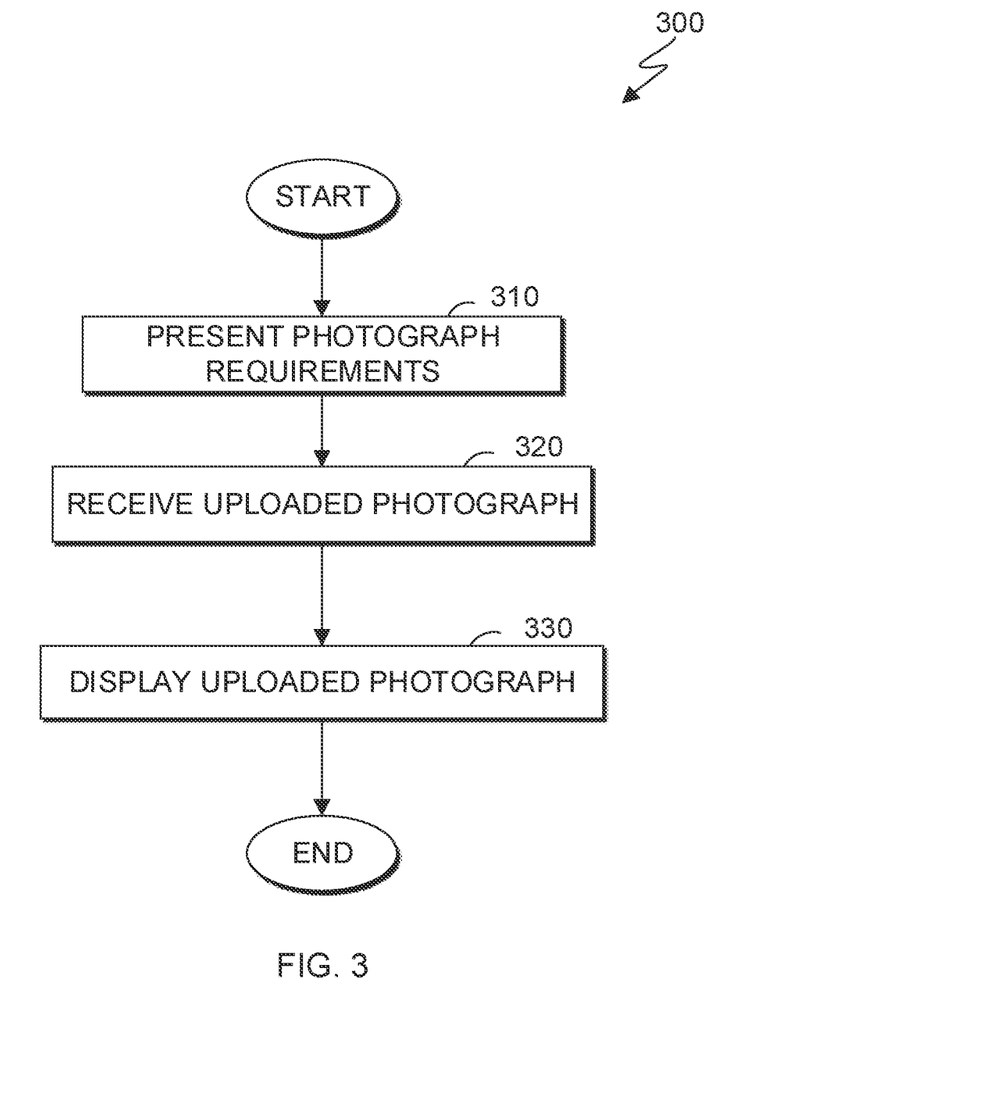
FIG. 3 is a flowchart depicting operational steps of a photo upload server program executing within the computer environment of FIG. 1, for presenting photograph requirements, and receiving and/or displaying a photograph that was captured according to the presented photograph requirements, in accordance with an embodiment of the present invention.

FIG. 3 depicts a flowchart 300 for the steps of photo upload server program 150, executing within computing environment 100 of FIG. 1, for presenting photograph requirements and, in some embodiments, receiving and/or displaying photographs uploaded to website 160 by photo upload client program 140.

In one embodiment, initially, a user may access an application, such as website 160 and navigate to a portion of the application or website 160 that requests or requires the user to upload a digital photograph.

In step 310, photo upload server program 150 generates and presents photograph requirements. In some embodiments, photo upload server program 150 generates a QR code. In other embodiments, photo upload server program 150 generates text-based photograph requirements. The photograph requirements that are present in either the text-based photograph requirements or the QR code are similar to those discussed with respect to photo upload client program 140. In some embodiments, the photograph requirements are included as data within the QR code. In other embodiments, the QR code includes a link that directs photo upload client program to photograph requirements. In some embodiments, photo upload server program 150 may further include session information in the photograph requirements that allows photo upload client program to automatically upload a captured image for processing by photo upload server program 150 and/or website 160. For example, the session information may include information as to where the photograph shall be uploaded to, identifying information to be applied to the photograph that enables website 160 and/or photo upload server program 150 to associate the uploaded photograph with the correct session.

In step 320, photo upload server program 150 receives an uploaded photograph. In some embodiments, photo upload server program may receive an uploaded photograph that includes metadata, watermarking, digital signatures, or other information that enables photo upload server program 150 to associate the uploaded photograph with a particular user session such that website 160 may successfully process the uploaded photograph.

In step 330, photo upload server program 150 may cause website 160 to display the uploaded photograph. Photo upload server program 150 may cause website 160 to display the uploaded photograph to enable user confirmation that the photo has been uploaded and uploaded correctly. In other embodiments, photo upload server program 150 may generate a notification to mobile device 120 specifying that the photograph has been uploaded successfully and/or that the uploaded photograph meets the photograph requirements.

Figure 4:
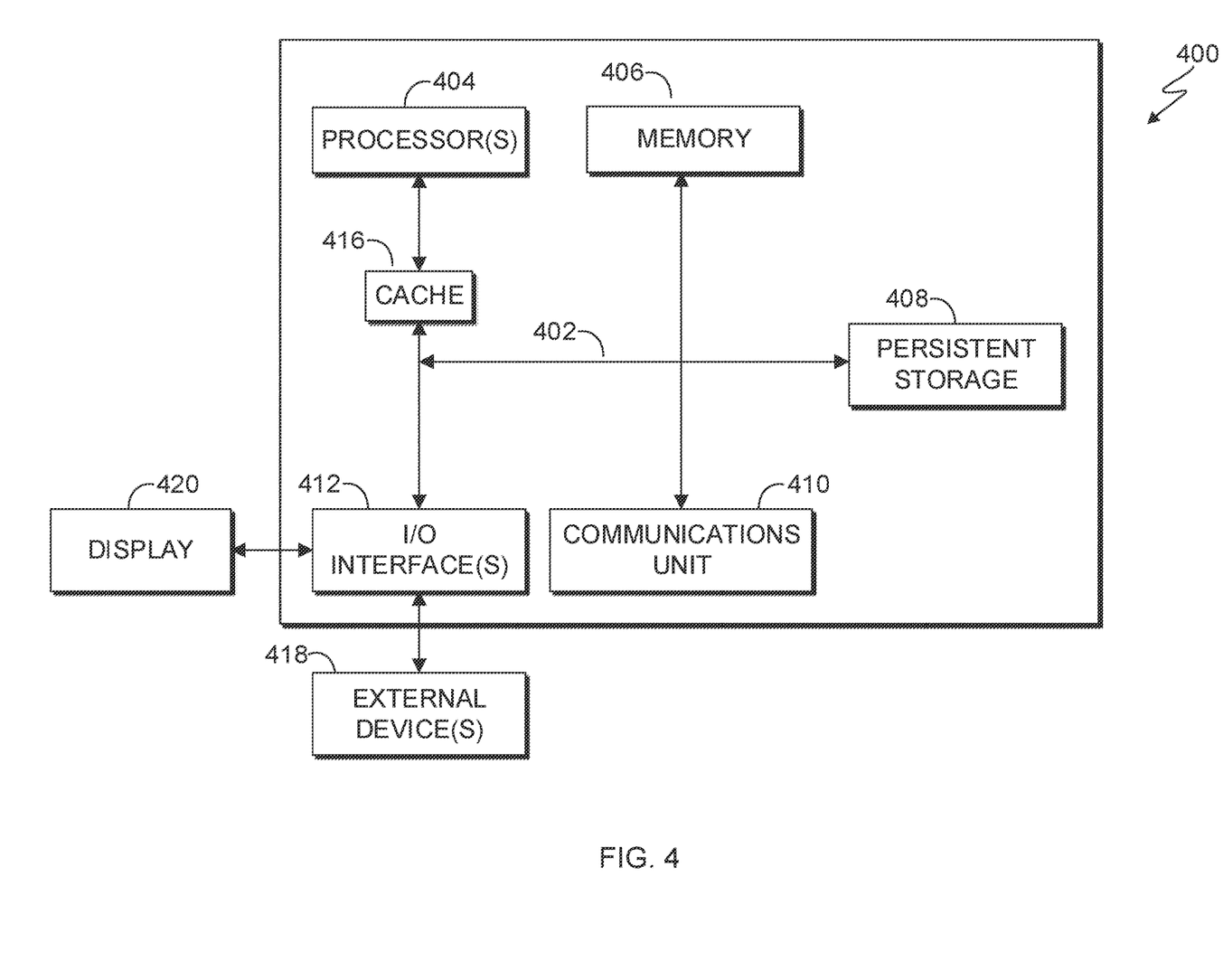
FIG. 4 is a block diagram of components of the mobile device and the server executing the photo upload client program and/or the photo upload server program, in accordance with an embodiment of the present invention.

FIG. 4 depicts a block diagram 400 of components of mobile device 120 and/or server 130, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Mobile device 120 and server 130 each include communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Photo upload client program 140 may be stored in persistent storage 408 of mobile device 120 and in memory 406 of mobile device 120 for execution by one or more of the respective computer processors 404 via cache 416. Photo upload server program 150 and website 160 may each be stored in persistent storage 408 of server 130 and in memory 406 of server 130 for execution and/or access by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Photo upload client program 140 may be downloaded to persistent storage 408 of mobile device 120 through communications unit 410 of mobile device 120. Photo upload server program 150 may be downloaded to persistent storage 408 of server 130 through communications unit 410 of server 130.

I/O interface(s) 412 allows for input and output of data with other devices that may be connected to server computer 102. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., photo upload client program 140, can be stored on such portable computer readable storage media and can be loaded onto persistent storage 408 of mobile device 120 via I/O interface(s) 412 of mobile device 120. Software and data used to practice embodiments of the present invention, e.g., photo upload server program 150 and website 160, can be stored on such portable computer readable storage media and can be loaded onto persistent storage 408 of server 130 via I/O interface(s) 412 of server 130. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   receiving, by one or more processors, a photograph requirement from textual information extracted from an image of an application, wherein the photograph requirement is associated with a photograph to be uploaded to the application;
   adjusting, by one or more processors, a camera setting based on the photograph requirement; and
   capturing, by one or more processors, the photograph in accordance with the adjusted camera setting.

2. The computer-implemented method of claim 1, further comprising obtaining, by one or more processors, the photograph requirement from a Quick Response (QR) code in the image of the application.

3. The computer-implemented method of claim 1, wherein receiving the photograph requirement from the textual information extracted from the image of the application comprises extracting, by one or more processors, the photograph requirement from text located within the image of the application utilizing optical character recognition (OCR) and machine learning techniques.

4. The computer-implemented method of claim 1, wherein adjusting the camera setting based on the photograph requirement comprises accessing, by one or more processors, an operating system (OS) integrated application programming interface (API) that enables adjustment of the camera setting based on the photograph requirement.

5. The computer-implemented method of claim 1, wherein the photograph requirement further includes a selection from the group consisting of: file size, time stamp inclusion, digital signature requirement, session detail, encryption requirement, and watermark requirement.

6. The computer-implemented method of claim 1, wherein the application is a website.

7. The computer-implemented method of claim 1, further comprising uploading, by one or more processors, the photograph to the application.

8. A computer program product comprising:
   one or more computer readable storage media, and program instructions collectively stored on the one or more computer readable storage media, the program instructions comprising:
   program instructions to receive a photograph requirement from textual information extracted from an image of an application, wherein the photograph requirement is associated with a photograph to be uploaded to the application;
   program instructions to adjust a camera setting based on the photograph requirement; and
   program instructions to capture the photograph in accordance with the adjusted camera setting.

9. The computer program product of claim 8, further comprising program instructions, collectively stored on the one or more computer readable storage media, to obtain the photograph requirement from a Quick Response (QR) code in the image of the application.

10. The computer program product of claim 8, wherein program instructions to receive the photograph requirement from the textual information extracted from the image of the application comprise program instructions to extract the photograph requirement from text located within the image of the application utilizing optical character recognition (OCR) and machine learning techniques.

11. The computer program product of claim 8, wherein program instructions to adjust the camera setting based on the photograph requirement comprise program instructions to access an operating system (OS) integrated application programming interface (API) that enables adjustment of the camera setting based on the photograph requirement.

12. The computer program product of claim 8, wherein the photograph requirement further includes a selection from the group consisting of: file size, time stamp inclusion, digital signature requirement, session detail, encryption requirement, and watermark requirement.

13. The computer program product of claim 8, wherein the application is a website.

14. The computer program product of claim 8, further comprising program instructions, collectively stored on the one or more computer readable storage media, to upload the photograph to the application.

15. A computer system comprising:
one or more computer processors, one or more computer readable storage media, and program instructions collectively stored on the one or more computer readable storage media for execution by at least one of the one or more computer processors, the program instructions comprising:
program instructions to receive a photograph requirement from textual information extracted from an image of an application, wherein the photograph requirement is associated with a photograph to be uploaded to the application;
program instructions to adjust a camera setting based on the photograph requirement; and
program instructions to capture the photograph in accordance with the adjusted camera setting.

16. The computer system of claim 15, further comprising program instructions, collectively stored on the one or more computer readable storage media for execution by at least one of the one or more computer processors, to obtain the photograph requirement from a Quick Response (QR) code in the image of the application.

17. The computer system of claim 15, wherein program instructions to receive the photograph requirement from the textual information extracted from the image of the application comprise program instructions to extract the photograph requirement from text located within the image of the application utilizing optical character recognition (OCR) and machine learning techniques.

18. The computer system of claim 15, wherein program instructions to adjust the camera setting based on the photograph requirement comprise program instructions to access an operating system (OS) integrated application programming interface (API) that enables adjustment of the camera setting based on the photograph requirement.

19. The computer system of claim 15, requirement further includes a selection from the group consisting of: file size, time stamp inclusion, digital signature requirement, session detail, encryption requirement, and watermark requirement.

20. The computer system of claim 15, wherein the application is a website.

* * * * *